United States Patent [19]

Steele

[11] Patent Number: 4,744,167
[45] Date of Patent: May 17, 1988

[54] STABILIZED WEEDLESS SCENT-EMITTING FISHING LURE

[75] Inventor: George Steele, East Greenbush, N.Y.

[73] Assignee: Kustom Anglers Inc., East Greenbush, N.Y.

[21] Appl. No.: 919,009

[22] Filed: Oct. 15, 1986

[51] Int. Cl.⁴ ............................................. A01K 83/00
[52] U.S. Cl. .................... 43/42.06; 43/42.1; 43/42.36; 43/43.2; 43/44.99
[58] Field of Search ................ 43/42.86, 42.36, 42.39, 43/42.97, 44.99, 44.81, 42.37, 43.2, 42.1

[56] References Cited

U.S. PATENT DOCUMENTS

| | | | |
|---|---|---|---|
| 1,754,567 | 4/1930 | Newell | 43/42.05 |
| 1,948,983 | 2/1934 | Danielczyk | 43/42.1 |
| 2,129,245 | 9/1938 | Stenstrom | 43/42.06 |
| 2,158,924 | 5/1939 | Bouton | 43/42.1 |
| 2,161,094 | 6/1939 | Saunders | 43/42.36 |
| 2,183,816 | 12/1939 | Lovelace | 43/42.06 |
| 2,219,225 | 10/1940 | Gambill | 43/43.2 |
| 2,625,767 | 1/1953 | Pokras | 43/42.36 |
| 2,836,954 | 4/1956 | Murray | 43/43.26 |
| 3,006,103 | 10/1961 | Scott | 43/42.06 |
| 3,083,492 | 4/1963 | Kling | 43/44.99 |
| 3,722,128 | 3/1973 | Tremblay | 43/42.1 |
| 3,953,934 | 5/1976 | Vissar | 43/42.06 |
| 3,971,152 | 7/1976 | Husson, Jr. | 43/42.06 |
| 4,217,721 | 8/1980 | Hershberger | 43/43.2 |

Primary Examiner—Nicholas P. Godici
Assistant Examiner—Karen Skillman
Attorney, Agent, or Firm—Schmeiser, Morelle & Watts

[57] ABSTRACT

An artificial fishing lure comprised of a keel-stabilized weight in combination with a hook fitted with a scent-emitting, weedless body composed of absorbent, resiliently deformable material. Said hook has auxiliary equipment attachment means for trailing spinners and the like.

2 Claims, 2 Drawing Sheets

STABILIZED WEEDLESS SCENT-EMITTING FISHING LURE

FIELD OF THE INVENTION

This invention relates to fishing lures generally and, in particular, to a novel fishing lure which incorporates light-weight, weedless, scent-emitting characteristics with stabilized weighting thus acquiring enhanced control and deception characteristics.

BACKGROUND AND OBJECTS OF THE INVENTION

It has been quite common invention in the art of angling to provide shields or covers for fishing hooks so that entanglement with and snagging on weeds (or more solid objects, such as subsurface logs) may be avoided. Intuitively, such a shielded fish hook (weedless hook) has as its purpose merely the avoidance of weeds or snags and should therefore be frangible or collapsible when struck by a fish. An invention embodying these fundamental concepts is one issued to Hershberger, U.S. Pat. No. 4,217,721, entitled WEEDLESS FISH HOOK. Essentially, Hershberger has provided an attachment to conventional single, double, or treble hooks which is comprised of a thin, plastic, bulbous-shaped element which fits over the hook shank, thus shielding the hook barbs.

Similar to the above, is the shield geometry suggested by Tremblay in his U.S. Pat. No. 3,722,128. Tremblay however, recognizing the need to overcome the unnatural appearance of a shielded hook, whether it contained bait, suggested the use of a porous shield that could also be used as a scent carrier.

From my years of experience, as a competition angler and a lure manufacturer, I discerned that, as helpful as the aforementioned inventions were, something more was still needed to overcome the most prevalent problem facing the sport fisherman. It is true that fishing hook and lure snags are onerous; however, in devising a compressible or resilient shield, and even impregnating that shield with fish lure or scent, the fisherman still finds himself confronted with two problems: the lack of weight in the finished apparatus (porous materials generally imply light-weight materials) and instability during retrieval, should some additional weight be added to the scented, weedless lure.

There exists also a third factor in the "unnatural" problems thus encountered; certain fish, notably the sun fish family comprising bluegill, goggle-eye and large-or smallmouthed bass, the perch family such as walleye, (perchpike) or sauger, and the pike family must be enticed or lured using entirely different techniques. For example, large-and smallmouthed bass will strike, depending upon water temperature and breeding season, at either natural or artificial bait or, in most instances, at whatever aggravates them; whereas, walleye generally shun unnatural or aggravating phenomenon and clearly prefer what appears to be, or smells like, their natural feed. It is therefore readily seen that, to engage in broad spectrum fishing, the angler cannot rely upon a weedless or even a weedless, scent-emittiing lure in its pristine form.

It is therefore an object of this invention to provide a fish hook, of either single, dual or treble arrangement, that can be rapidly adapted to weedless operation.

Another object of this invention is to provide a fish hook possessing means of attachment for other fishing paraphenalia.

Yet another object of the present invention is to provide for the aforementioned apparatus (that is, the hook with shield attachment) a means or method of weighting the apparatus while lending to it stability, as it is drawn through the water.

In conjunction with the aforementioned stabilized weighting, it is yet another object of the invention to provide means on the stabilized weight for attaching other apparatus, notably such apparatus as mentioned in the first two objects of the invention for the purpose of greater deception.

It is yet another object of this invention to provide a lure of great versatility, being easily mutable for attraction or stimulation of the several classes of game fish.

It is an all-encompassing object of this invention to provide solutions to the aforementioned problems encountered by the competition angler, as well as the leisure time sportsman, that will be both expedient and inexpensive.

The objects and advantages of the instant invention are set forth in part herein, while others will be obvious herefrom, and may be learned by practice with the invention by even those unskilled in the art of angling.

SUMMARY OF THE INVENTION

It has been found that all the objects of this invention may be realized by constructing a fishing lure of the type denoted in the title. To achieve this, an ordinary fishing hook of either single, dual or treble barb (hook) is first fitted with an eyelet at the base of the hook shank, to be used for fitting or attaching other angling apparatus. Thereafter, a weed shield comprised of essentially sponge-like material, having the usual absorbent and resiliently deformable material characteristics, is fitted down over the shank eye so that it rests on the up-curved portions of the hook(s) and with a portion of its outer periphery (in the event that an essentially globular or cylindrical shape is employed) engages and covers the tip or barb portions of the hooks. Thereafter, in the routine of assembly, the hook eye is fitted with a split-ring fastener and to that is attached the special stabilizing weight that forms an important part of the overall invention.

The stabilizing weight is a hydrofoil comprising an essentially pyramidal or keeled, triangular weight which has at its apex and base means for attaching other apparatus. In one embodiment, the keeled weight has a hole or chamber coaxial to its major axis. Through such a hole is passed the fishing line which is then terminated by tieing at the split ring fastener last mentioned above. Attachment of the split ring to the eye of the hook now completes the assembly of the lure apparatus. The base of the stabilizing weight has an extension about which may be wrapped stranded, flexible material effecting a skirted sensation to the overall lure. The skirt lends an additional weed shield characteristic and the inventor attests to the usefulness, for deception, of a spinner attached to the base of the aforementioned hook.

It should be understood that the foregoing general description and the following detailed description as well as the appended claims, are meant to serve as examples and illustrations of the invention in its preferred, yet unrestricted mode. Thus, while the apparatus is described in its fullest sense (that is, a stabilized weight with the scented, weedless hook bearing additional means for trailing attachments), those versed in the art will readily note the divisibility of selected features from the complete apparatus and their individual utility.

The accompanying drawings illustrate a single preferred embodiment of the invention, and together with this description, serve to explain the principle of my invention.

DETAILED DESCRIPTION OF THE DRAWINGS

Figure 1A:
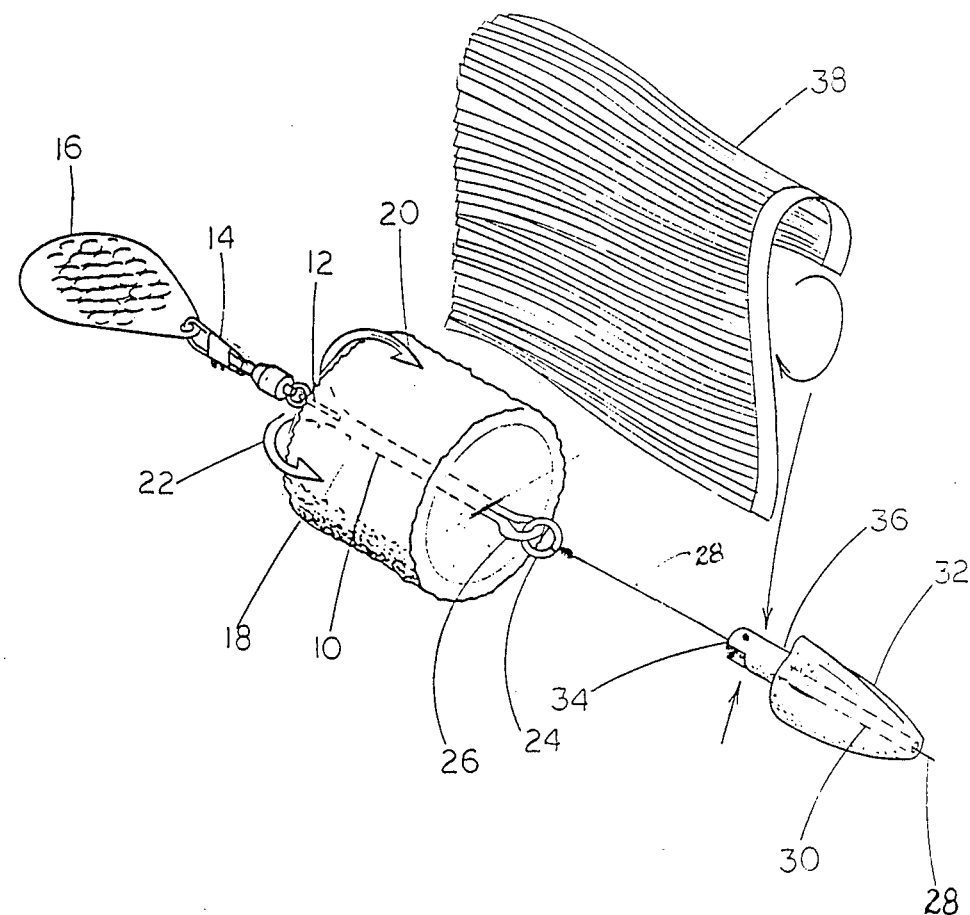
FIG. 1A is an exploded view of the invention, partially in phantom.

Referring more particularly now to FIG. 1A, the exploded view of the apparatus shows the preferred embodiment. The treble hook 10 has, as an integral part, attaching ring 12 at its shank base. Attached to the hook attachment ring is a swivel clasp 14 (not considered part of the invention). Thereafter, attached to the swivel clasp 14 is a spinner 16. The weed shield 18 is depicted in phantom as fitting down over the hook shank and covering the inward-facing hook barbs 20, but not protruding beyond the curved portions 22 of the hook. The shield is a simple cylinder or ball of sponge, either natural or artificial, with a small slit passing centrally through its major axis. Prior to the step of assembling the hook shield, the shield is either dipped in, or otherwise saturated, with suitable fish lure scent.

After the shield 18 is applied to the hook, another split ring 24 is attached to the hook eye 26. At this time the fishing line 28 may be attached to the ring 24.

However, to employ the apparatus in its fullest mode, before attaching fishing line 28 to split ring 24, it is fed through the central chamber 30 of the stabilizing weight 32. Thereafter it is tied to the split ring 24 and drawn towards the hook so that split ring 24 seats at clevis 34 on the weight's tail-like extension 36. If the angler so desires, skirting material 38 may be wound about and secured to extension 36 as illustrated by the arrows of FIG. 1A.

Figure 1B:
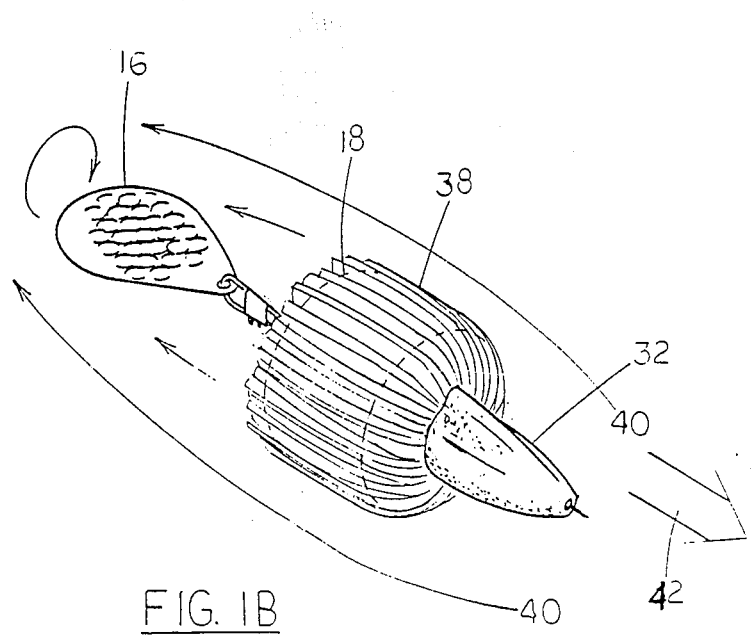
FIG. 1B is an illustration of the assembled invention in its aqueous/operational environment.

FIG. 1B depicts the assembled lure apparatus operating in its intended environment. The lure is drawn through the water 40 in the direction depicted by broad arrow 42. The stabilizing weight is essentially a hydrofoil and effects essentially laminar water flow over itself, the skirt 38, and weed shield 18 apparatus. The flow is so perfectly laminar that spinner 16 is immediately actuated. The compressibility of the shield material 18 is such that, depending upon the force with which the lure is retrieved, a variable amount of scent will be emitted.

Figure 2:
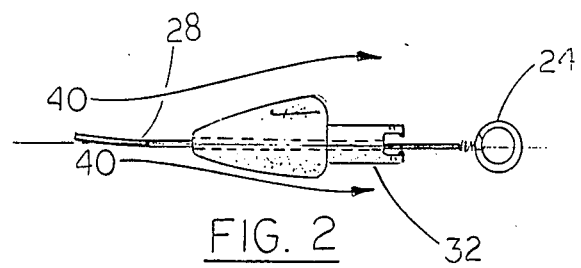
FIG. 2 is a side view of the stabilizing weight.

FIG. 2 depicts the keeled, pyramidal, stabilizing weight which has been described earlier as a weighted hydrofoil. Arrows 40 depict the essentially laminar flow which gives the stabilizing characteristic to this shape.

Figure 3:
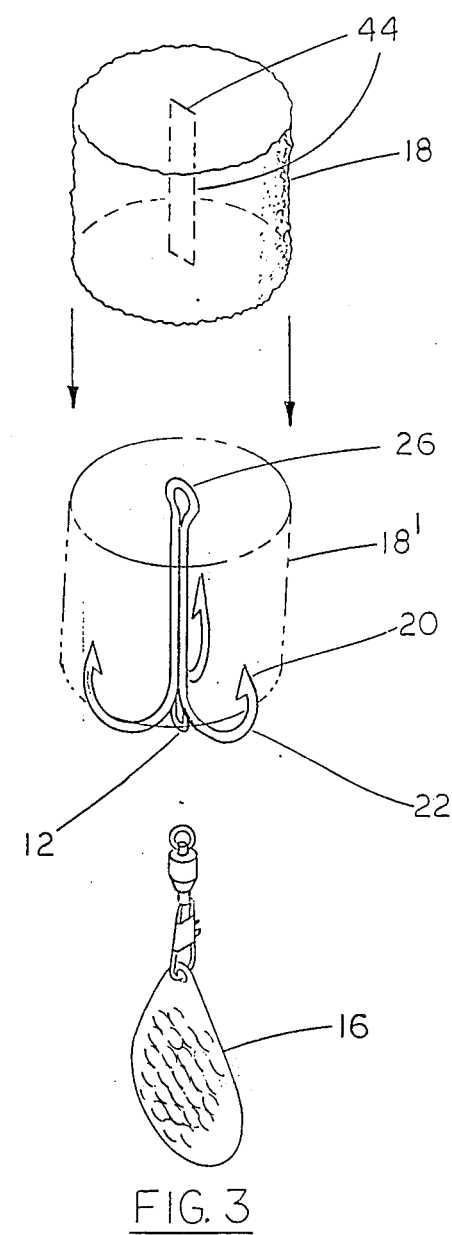
FIG. 3 is an isometric view depicting the assembly of the scent emitter shield and trailing apparatus to the hook of the invention.

FIG. 3 more clearly defines the scent-emitting weed shield 18 with its major axial aperture 44 therein. It is only necessary to provide a minute slit to effect aperture 44 as the eye 26 of any commercially manufactured hook, even with ring 24 attached, can pass easily therethrough. The reader's attention is called to the fact that the shield is fitted down over the shank, being compressed by finger pressure only, to the extent that it is necessary to work the material by the barbs. The barbs of the hook should not penetrate the shield material but rather rest firmly against it once in the position depicted by phantom shield 18'.

In operation, the fish, either attracted by the scent or stimulated by the motion of the lure, strikes over the region generally covered by skirt 38. The force of its compressing jaws, considerable in the case of a large bass or pike, immediately compresses the shield exposing barbs 20 of the hook. Because of the laminar flow 40 afforded by the weight 32 in combination with skirt 38, there has been no bubble-producing turbulent flow and, consequently, the fish has not been alerted to the unnaturalness of its prey. The masking scent indeed lends its camouflage to this activity; however, from my experience in the use of this invention without scent, I have gleaned almost identical results. In fact, it appears that the best results are obtained through the use of the stabilized weight, the cloaking skirt, shielded hook (for weedless effect), and the use of a trailing spinner to effect tail-like motion of natural bait.

It is not my intention to limit this invention to the specific embodiment herein shown and described but rather to disclose such so that the inveterate fisherman, as well as those practicing the art for art's sake, may enjoy such without departing from the principles of the invention nor sacrificing its chief advantages.

I claim:

1. An artificial fishing lure comprising:
   a keeled hydrofoil weight having means for attaching additional other paraphernalia thereto;
   a hook attachable to said weight having thereon an attaching ring at the hook shank base for attaching artificial and natural lures thereto;
   a weed shield comprised of a spongeonous mass removably placable on the shank of said hook in registry with the barbs of said hook so that said barbs rest on the periphery of said shield and further comprising porous, resilient material adapted to absorb fish scent and to readily compress when struck by a fish and to resist weed entanglement, and further said mass having a single passageway therethrough coextensive with the central axis of said mass whereby said mass is fitted over the shank of a hook and rested in the curved portion of said hook so that said mass surface is in registry with the barbs of said hook shielding said barbs from weed entanglement; and
   a multi-leafed skirt attachable to said weight for covering said shield, whereby said skirt trailing over said mass affords added resistance to weed entanglement without resisting penetration by the barbs of said hook when said lure is struck by a fish.

2. The invention of claim 1 wherein said porous mass has a single passageway therethrough coextensive with the central axis of said mass whereby said mass is fitted over the shank of a hook and rested in the curved portion of said hook so that the mass surface is in registry with the barbs of said hook shielding said barbs from weed entanglement.

* * * * *